G. M. EATON.
RESILIENT DRIVING CONNECTION.
APPLICATION FILED FEB. 3, 1916.

1,279,998.

Patented Sept. 24, 1918.

WITNESSES:
Fred. A. Lind.
W. E. M?Coy.

INVENTOR
George M. Eaton
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,279,998. Specification of Letters Patent. Patented Sept. 24, 1918.

Application filed February 3, 1916. Serial No. 76,024.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Driving Connections, of which the following is a specification.

My invention relates to means for resiliently and operatively connecting two members and particularly to such means as are interposed between the driving wheels and the rotatable members of the propelling units of railway vehicles and the like.

One object of my invention is to provide a structure of the class under consideration which shall effectively minimize the vibration set up by the slipping of the driving wheels and cushion blows or shocks caused by sudden changes in the angular velocity of the rotating locomotive parts.

Another object of my invention is to provide a resilient driving connection having a crank pin and embodying a relatively large amount of resilient material.

Heretofore, in constructing resilient driving connections of the class under consideration, it has been found necessary to reduce the amount of spring material therein if a crank pin was employed. My invention provides a means for constructing a resilient connection having a crank pin without changing the amount of spring material normally embodied in the driving connection, as will be hereinafter more fully set forth.

Figure 1:
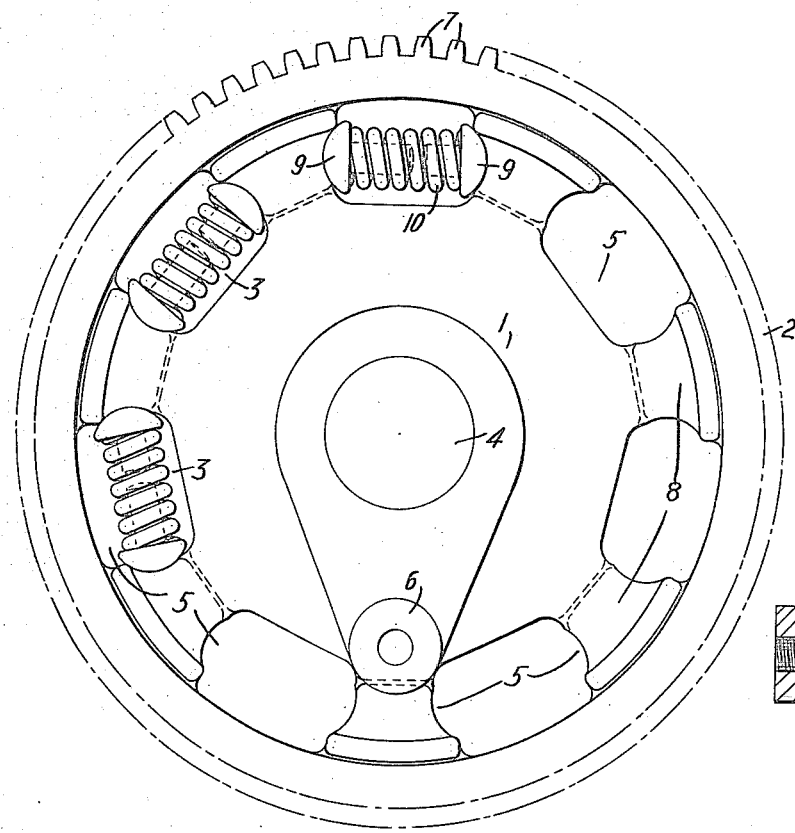
Figure 2:
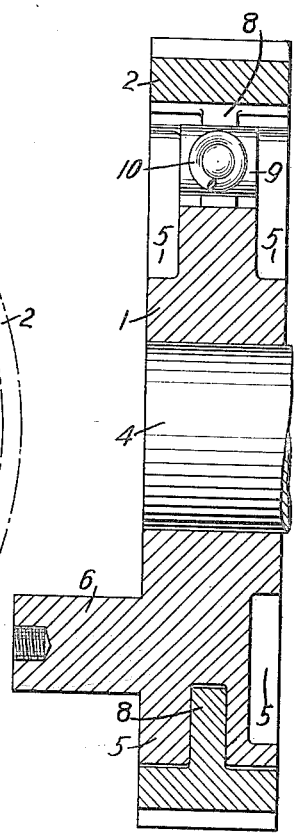

Figure 1 of the accompanying drawing is a side view, partially in elevation and partially in section, with parts broken away, of a driving connection embodying my invention. Fig. 2 is a sectional view of the device shown in Fig. 1.

The driving connection illustrated in the drawing comprises a hub member 1 and a rim member 2 that is operatively and resiliently connected thereto by a plurality of connectors 3.

The hub member 1 is mounted upon a shaft 4 and is provided with a plurality of radially-extending channeled projections 5 and has an integral crank pin 6 which is shown as disposed contiguous to one side of one of the channeled projections 5 and has its axis in a radial plane that bisects said projection.

The rim member 2 is annular in form, has gear teeth 7 disposed around its periphery and is provided with a plurality of radial projections 8 which are disposed between the sides of the channeled projections 5. The channeled projections 5 and the coöperating projections 8 serve as seats or pockets for the connectors 3 which are tangentially disposed therein. The openings in the channeled projections 5 are sufficiently large to admit projections 8 therein when the gear is being assembled. The adjacently-disposed sets of coöperating projections 5 and 8 serve as seats or pockets for the reception of approximately semicylindrical blocks 9 which, with tangentially-disposed helical springs 10, constitute the connectors 3. Each of the blocks 9 has a cylindrical portion that projects into the adjacent end of the corresponding spring 10.

In assembling such a connection as I have herein described, the rim member 2 is moved relative to the hub member 1 until the projections 8 are admitted between the channeled projections 5, when the hub member 1 is turned to its operative position, as shown in the drawing. The helical springs 10 are respectively mounted upon their spring-retaining members 9 and the resilient connectors 3, so constituted, are compressed and inserted into the pockets formed by the coöperating projections 5 and 8.

When power is applied to rotate the rim member 2 in either direction, it will tend to move independently of the hub member 1 by reason of the compression of the springs 10 of the connectors 3. This independent movement will continue until the springs have been sufficiently compressed to resist further relative movement, whereupon the hub member 1 will be rotatively actuated.

In a resilient connection of the general class herein described, it has been found necessary to omit a spring pocket on the hub member when such a connection has been provided with a separable crank pin in order that the crank pin may be surrounded by an amount of metal sufficient to retain the same in place during the operation thereof. It was found necessary to also omit a portion 8 in order that the connection might be assembled, for it was not deemed advisable to cut a channel between the portions 5 so deep as to disturb the metal required to hold the pin member in place. The result was that, in the older forms of construction, one spring member was omitted entirely and one of the remaining spring members was rendered inoperative in one direction of rotation. It will be readily seen that, by forging or otherwise constructing the crank pin integral with the hub member, as hereinbefore described, a complete set of symmetrically-disposed resilient connectors, all of which are effective in both directions of operation, may be embodied in such a connection as I propose.

While I have described my invention in a simple and preferred form, it is not necessarily so limited, and I desire, therefor, that only such limitations shall be imposed as are indicated in the appended claims.

I claim as my invention:

1. In a driving connection, the combination with a hub member, an annular rim member, coöperating radial projections on said members and means interposed between said projections for operatively connecting said members, of a crank pin disposed upon one of said projections.

2. In a driving connection, the combination with a hub member having symmetrically-disposed radial projections that are circumferentially channeled, a rim member having radial projections disposed between said channeled projections and registering therewith to form pockets therebetween, and means inserted in said pockets for operatively joining said hub and rim members, of a crank pin disposed upon one side of one of said channeled projections.

3. In a driving connection, the combination with a hub member having, on its periphery, a series of equally spaced radial projections that are circumferentially channeled, of a rim member having radial projections disposed between said channeled projections and registering therewith to form pockets therebetween, and means inserted in said pockets for operatively joining said hub and rim members, and a crank pin formed integral with said hub contiguous to one of said channeled projections.

4. In a resilient connection, the combination with a hub member having laterally spaced radial projections arranged in sets with channels therebetween, said sets being spaced apart equal distances peripherally of the hub, of a rim member having radial projections disposed between said hub projections and resilient means inserted between said projections for connecting said hub and said rim members, and a crank pin formed integral with said hub member and having its axis disposed in a radial plane that bisects one of said hub projections.

5. In a driving connection, the combination with a rim member having radial projections, a hub member within said rim member and having laterally-spaced radial projections coöperating with said rim projections to form a series of apertures spaced apart equal angular distances on the gear, and means inserted within said apertures for operatively joining said members, of a crank pin formed integral with a portion of one of said projections.

6. A resilient driving connection comprising a hub member having a plurality of radially-extending channeled projections, and a crank pin disposed on one of said channeled projections, a rim member having a plurality of inwardly-extending projections that are adapted to be received within said channeled projections, and resilient means operatively connecting said members.

7. A resilient driving connection comprising a member having a plurality of radially-disposed projections having apertures therebetween, a member having a plurality of radially-disposed channeled projections that are adapted to receive said web projections, resilient means disposed within said apertures, and a crank pin disposed upon one of said projections.

8. A driving connection comprising a hub member having a plurality of symmetrically-disposed radially-extending channeled projections and a crank pin integral therewith and disposed upon one of said channeled projections, a rim member having a plurality of inwardly-extending projections that are adapted to be received by said channeled projections, and means for operatively connecting said members.

9. In a driving connection, the combination with a hub member having a plurality of radially-extending channeled projections, a rim member having a plurality of inwardly-extending projections that are adapted to register with said channeled projections, and means for operatively connecting said members, of a crank pin connected to said hub member and contiguous to one of said hub projections.

In testimony whereof, I have hereunto subscribed my name this 28th day of Jan. 1916.

GEORGE M. EATON.